United States Patent
Song

(10) Patent No.: US 7,561,396 B2
(45) Date of Patent: Jul. 14, 2009

(54) APPARATUS FOR MONITORING OPEN STATE OF THE SECONDARY TERMINALS OF A CURRENT TRANSFORMER

(75) Inventor: Ki-Chan Song, Seoul (KR)

(73) Assignee: Samsung Measuring Instruments Co., LTD (KR)

( * ) Notice: Subject to any disclaimer, the term of this patent is extended or adjusted under 35 U.S.C. 154(b) by 459 days.

(21) Appl. No.: 11/076,562

(22) Filed: Mar. 9, 2005

(65) Prior Publication Data

US 2005/0201033 A1    Sep. 15, 2005

(30) Foreign Application Priority Data

Mar. 9, 2004   (KR) .................. 20-2004-0006317 U
Aug. 19, 2004  (KR) .................. 10-2004-0065294
Feb. 16, 2005  (KR) .................. 20-2005-0004145 U

(51) Int. Cl.
   *H02H 7/041* (2006.01)
(52) U.S. Cl. ....................... 361/93.5; 361/35
(58) Field of Classification Search ................ 361/93.5, 361/35, 38, 91.1, 111
   See application file for complete search history.

(56) References Cited

U.S. PATENT DOCUMENTS

| | | | | |
|---|---|---|---|---|
| 3,409,783 A | * | 11/1968 | Baehr et al. ................... | 307/64 |
| 4,309,734 A | * | 1/1982 | Warren ........................ | 361/58 |
| 4,521,822 A | * | 6/1985 | Simard ........................ | 361/35 |
| 4,589,052 A | * | 5/1986 | Dougherty ................... | 361/94 |
| 4,788,620 A | * | 11/1988 | Scott .......................... | 361/96 |
| 5,099,177 A | * | 3/1992 | Ta niguchi et al. ........... | 315/130 |
| 5,124,875 A | * | 6/1992 | Ishii et al. .................... | 361/93.5 |
| 5,222,009 A | * | 6/1993 | Scharnick et al. ............. | 361/28 |
| 5,636,288 A | * | 6/1997 | Bonneville et al. ........... | 381/110 |
| 6,462,924 B1 | * | 10/2002 | Watanabe et al. ............ | 361/91.2 |
| 6,813,124 B1 | * | 11/2004 | Pierson ....................... | 361/35 |

FOREIGN PATENT DOCUMENTS

JP    10-144540    *   5/1998

* cited by examiner

*Primary Examiner*—Danny Nguyen
(74) *Attorney, Agent, or Firm*—The Farrell Law Firm, PC

(57) ABSTRACT

Disclosed herein is an apparatus for connection to the secondary terminals of a CT to prevent CT damage and electric shock when the secondary terminals are opened, by providing an input signal and operating a relay circuit to short the CT secondary terminals. The apparatus monitors opening of the CT secondary terminals, and to prevent accidental opening, determines opening and provides an over voltage breaking upon opening. To prevent false operation of the protecting relay connected to the secondary terminals caused by the over voltage generated by accident other than opening of the CT secondary terminals, a secondary delay time of operation of the protecting relay is provided that can be variously set by DIP switch or otherwise, allowing the user to choose a desired setting. Further, expected over voltage values can be set according to load characteristics, allowing the apparatus to operate during voltage above the set value.

4 Claims, 7 Drawing Sheets

APPARATUS FOR MONITORING OPEN STATE OF THE SECONDARY TERMINALS OF A CURRENT TRANSFORMER

PRIORITY

This application claims priority to Korean Patent Applications 20-2004-6317, 10-2004-65294 and 20-2005-4145, respectively filed with the Korean Patent Office on Mar. 9, 2004, Aug. 19, 2004 and Feb. 16, 2005, the contents of which are incorporated herein by reference.

BACKGROUND OF THE INVENTION

1. Field of the Invention

The present invention relates to an apparatus for monitoring open state of the secondary terminals of a Current Transformer (CT), more specifically speaking, relates to an apparatus that is connected directly to the secondary terminals of the CT and prevents the damage of the CT and the electric shock when the secondary terminals are opened, by making it an input signal and operating the relay circuit and so shorting the secondary terminals of the CT. Moreover the present invention relates to an art that prevents a misjudgment of the open state of the secondary terminals considering the operating time of other relays connected to the secondary terminals of the CT.

2. Description of the Related Art

A Current Transformer ('CT' hereinafter) is a transformer that is used to expand the measuring ranges of the AC ammeter by gaining small current from large AC current. The CT has primary coil whose number of winding wire is small and secondary coil whose number of winding wire is large and each coil is rolled up at an iron core like a transformer, and a measuring apparatus like an ammeter, a wattmeter, and a relay is connected to the secondary coil. Moreover, the rated current of the primary current of the CT is from several tens of amperes to several thousand amperes, and typically the rated secondary current is almost 5 amperes, with the ratio of primary to secondary current being in inverse proportion to the number of the winding wire of coils.

Meanwhile shorting the secondary terminals of the CT is safe, but opening it is very dangerous. This is because if the secondary coil is opened in the state of flowing current at the primary coil of CT, the primary current magnetizes all iron cores, the iron cores are saturated and generate heat, so there are dangers of damage of the coil, explosion of the CT, and electric shock. Therefore if the inner circuit of measuring apparatus like the ammeter, wattmeter connected to secondary coil of the CT is opened or the secondary coil of the CT is opened for the other reason, a circuit that can short the open secondary terminals at once needs to be connected to the secondary terminals.

A monitoring circuit like the above monitors the open state and shorts the terminals. After that, short state must be maintained continually until the manager finds the cause of opening of the secondary terminals of the CT and eliminate it. If it changes to open state suddenly during the manager's repair, an accident of electric shock may happen.

Regardless of this danger, there are almost no measures to prevent accidental opening of the secondary coil of the CT yet, and there is a need for an invention to prevent such accidental opening and to minimize the associated danger.

In addition, in case of testing or repairing the CT and other measuring apparatus like the ammeter, wattmeter, relay, and recorder connected to the electric equipment, maintaining short state safely during the work is necessary to prevent the electric shock.

In this case since no special apparatus that can short the secondary terminals of the CT has been prepared, there were many inconvenient things. That is, as the secondary terminals of the CT must be shorted in the state of supplying the sources of electricity without stopping the operation of the total electric equipment, danger of electric shock always existed.

SUMMARY OF THE INVENTION

A preferred embodiment of the apparatus for monitoring open state of the secondary terminals of a CT according to the present invention includes a circuit protection unit connected to the secondary terminals of the CT and breaking the over voltage by diminishing the open voltage of the secondary terminals; a rectification unit that rectifies the voltage signal that passed said circuit protection unit; a comparison unit that compares the voltage signal outputted from said rectification unit and pre-set standard voltage and outputs the voltage signal about the opening of the secondary terminals; and a short circuit unit that is operated by the voltage signal outputted from said comparison unit and shorts said opened secondary terminals.

In this case, it is preferable that the short circuit unit will include a relay coil that generates magnetic-induction caused by the current flow according to the voltage signal about the opening of the secondary terminals outputted from said comparison unit; and a short switch that shorts the secondary terminals of said CT by the magnetic induction of said relay coil.

And it is preferable that the apparatus will further include an alarm switch that operates the alarm system about the opening of said secondary terminals by the voltage signal about the opening of secondary terminals outputted from said comparison unit.

In addition, it is preferable that the apparatus will further include a test switch that can short the secondary terminals of said CT by connecting sources of electricity to said short circuit unit and operating it.

And it is preferable that the apparatus will further include a buffer amplification unit that amplifies the signal rectified by said rectification unit.

It is preferable that the apparatus will further include a reset switch that terminates the operation of the short circuit unit operated by the opening of said secondary terminals.

A preferred embodiment of the apparatus for monitoring open state of the secondary terminals of a CT according to the present invention has a means for judging the opening, and a number of protecting means including over voltage breaking means according to the opening, and in order to prevent the false operation of the other protecting relays connected to the secondary terminals caused by the over voltage generated by an accident except the opening of the secondary terminals of the CT. And secondary delay time that said other protecting relays can operate is given and lets said apparatus operate after prescribed time, and lets the user choose a desired set value according to the necessity by setting said secondary delay time variously by one means among a number of means including a DIP switch.

In this case in order not to judge that the secondary terminals of the CT is open by the over voltage generated temporarily when the normal operation of various load including motor starting, by setting expected over voltage value variously according to the characteristics of the load in advance, lets the user choose the over voltage value suitable for the characteristics of the load according to the necessity, in this case said over voltage value is set by one means among various means including a DIP switch, said apparatus operates when voltage over than the value set by the user is inputted to the CT, and indicating operating state by using one or more means among a number of warning indicating means is preferable when open signal of the secondary terminals of the CT is monitored.

A preferred embodiment of the apparatus for monitoring open state of a CT according to the present invention that shorts the secondary terminals by making said open voltage as the input signal in case that the secondary terminals of the CT is open, said apparatus will preferably include a circuit protection unit that breaks the over voltage to prevent the damage of the monitoring circuit from the open voltage having over voltage value and outputs safe voltage; a rectification circuit unit that outputs DC voltage by making the safe voltage outputted from the circuit protection unit as an input signal; a front-end amplification unit that amplifies the DC voltage value outputted from said rectification circuit unit by using special external applied electric power source; a comparison amplification unit that compares the amplified voltage from said front end amplification unit and applied standard voltage, and outputs (+) voltage if said amplified voltage is higher than said standard voltage and outputs (−) voltage if said amplified voltage is lower than said standard voltage; a current connection unit that flows current to the relay coil by a transistor operates by making said (+) output voltage signal as a current control signal in case that said comparison amplification unit outputs (+) voltage because of the opening of the secondary terminals of the CT; and a relay circuit unit that shorts the secondary terminals of the CT if current flows to the relay coil by said current connection unit and so the short switch is closed, and maintains the short stage of the secondary terminals continually until the system is reset by the close of the magnetism-maintaining switch.

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawings, where.

DETAILED DESCRIPTION OF THE PREFERRED EMBODIMENTS

Figure 1:
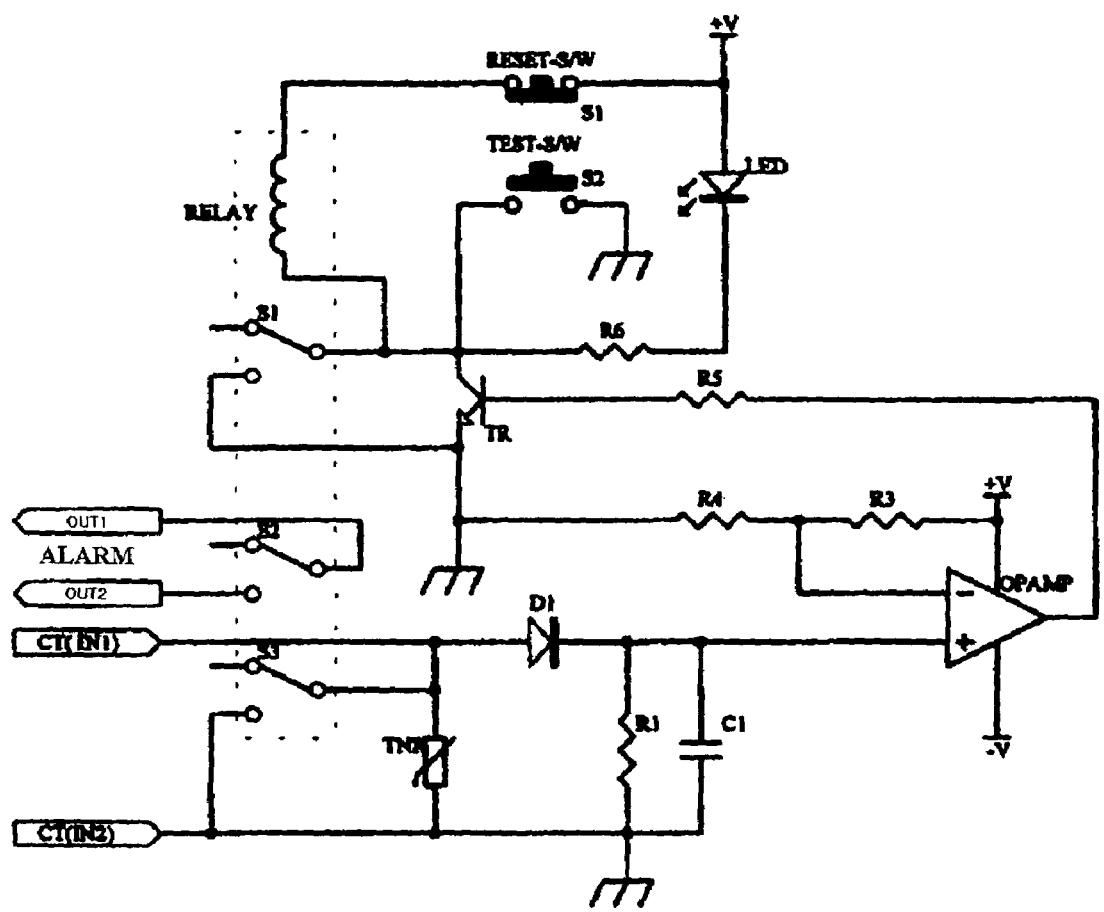
FIG. 1 is a circuit diagram of a preferred embodiment of a relay type apparatus for monitoring open state of the secondary terminals of a CT according to the present invention.

Hereinafter, preferred embodiments of the present invention will be described in detail with reference to the accompanying drawings. The same or similar components in drawings are designated by the same reference numerals as far as possible despite being are shown in different drawings. In the following description of the present invention, a detailed description of known functions and configurations incorporated herein will be omitted to avoid obscuring the subject matter of the present invention with unnecessary detail.

1. A First Preferred Embodiment

This embodiment relates to a relay type apparatus for monitoring an open state of a CT. This apparatus includes a circuit protection unit connected to the secondary terminals of a CT and breaks over voltage by diminishing the open voltage of the secondary terminals, a rectification unit that rectifies the voltage signal that passed said circuit protection unit, a comparison unit that compares the voltage signal outputted from said rectification unit and a pre-set standard voltage and outputs the voltage signal about the opening of the secondary terminals, a relay coil that generates magnetic-induction caused by the current flow according to the voltage signal about the opening of the secondary terminals outputted from said comparison unit; and a short switch that shorts the secondary terminals of said CT by the magnetic-induction of said relay coil.

The principle of the operation of this apparatus is, the input terminals of the circuit connect to the secondary terminals of a CT, to receive the voltage induced at the time of opening the secondary terminals of the CT as an input signal.

Inputted voltage of a high voltage value can damage the circuit so breaking the over voltage is necessary to protect the monitoring circuit. In this embodiment, the over voltage is broken by inserting a varistor (TNR) for circuit protection.

In order to use the voltage that passed the means of circuit protection as a signal source, it is rectified at the diode (D1), and the output waveform is flattened and changed to DC at the condenser (C1). Here, the resistor (R1) prevents the discharge of the condenser and the opening of the input of the comparison amplifier (OP amp).

The rectified signal is inputted to the comparison amplifier, and the comparison amplifier compares the voltage of the input signal and a standard voltage and outputs a result value, which is low (L) or high (H) according to whether the secondary of the CT is open. In this embodiment, a positive (+) voltage is outputted if the CT secondary is opened, that is if the voltage of the input signal is higher than the standard voltage, and a negative (−) voltage is outputted if the CT secondary is not open.

When the positive (+) signal is outputted from said comparison amplifier because of the opening of the CT, this output signal limits the current through the resistor (R5) and is applied to the base of the transistor (TR). Like this, if voltage is applied to the base of the transistor, current of the collector flows to the emitter, allowing current to flow at the relay coil.

When current flows at the relay coil, the first linkage switch (S1) is operated by magnetic-induction, and electric potential of one side of the relay is grounded, making the relay maintain magnetism, and limiting current through the resistor (R6). Moreover, the second linkage switch, that is the alarm switch (S2), is connected to the alarm system, and by generating an alarm when the relay operates, it lets a manager know of the open state of the CT. If the third linkage switch, that is the short switch (S3), operates, then the open terminals of the CT will be shorted. Meanwhile, in this embodiment by connecting a special Light Emitting Diode (LED), operation state is shown during the operation of the relay.

A reset switch (RESET-Sw) terminates the magnetism maintaining of the relay, and when pushed the voltage of the relay turns off, so the function of magnetism maintaining disappears and the relay comes back to original state. Therefore after the inspection of the cause of opening and repair, the manager operates the reset switch and resets the relay status.

The circuit of this embodiment further comprises a special test switch (TEST-SW) to operate the relay as though the open state of a CT were to occur, i.e. to simulate the open state. As shown in FIG. 1, if the TEST-SW is pushed, one side of the relay is earthed and so current flows at the relay coil and the secondary terminals of the CT maintains the short state by magnetic-induction. This test switch is used when shorting the secondary terminals of the CT safely to test the measuring apparatus like an ammeter, a wattmeter, which is connected to the rear side of the CT.

Figure 2:
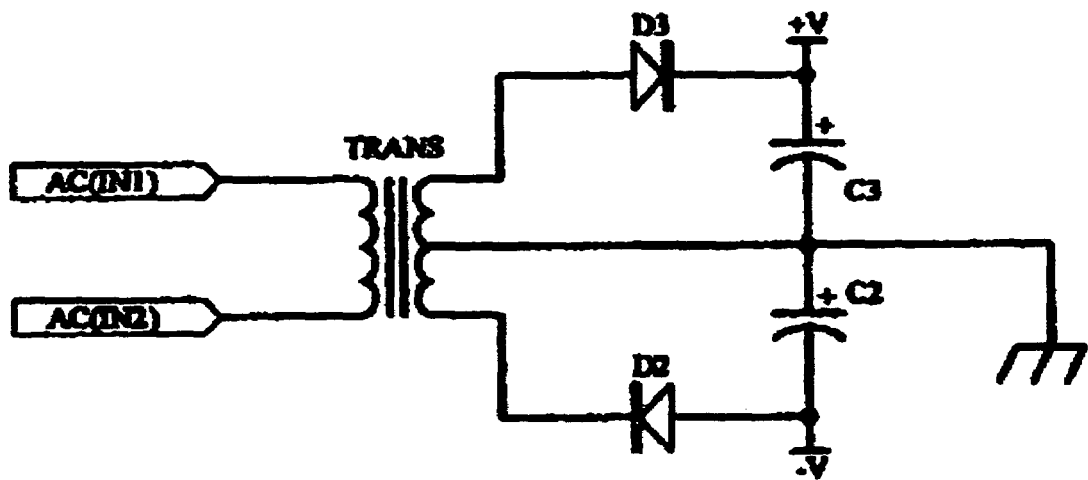
FIG. 2 is a circuit diagram of the electric power-supplying unit that is supplied to the monitoring circuit of the present invention.

Meanwhile, the structure of the circuit of the electric power-supplying unit that is supplied to the monitoring circuit of the present invention is shown in FIG. 2. As shown, the structure is that AC electric power is connected to the primary terminals of the transformer and so decompressed voltage is induced to the secondary terminals of the transformer, and the decompressed voltage is rectified through the diode (D2, D3) and becomes flattened through the condenser (C2, C3) and is supplied to the monitoring circuit.

2. A Second Preferred Embodiment

This invention relates to an apparatus for monitoring open state of the secondary terminals of an electronic type current transformer.

Figure 3:
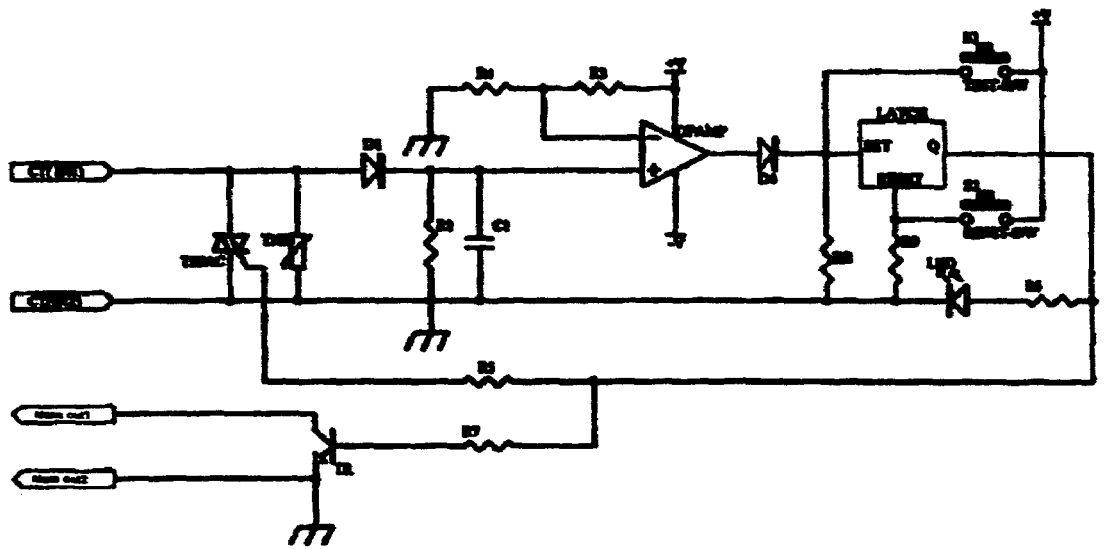
FIG. 3 is a circuit diagram of a preferred embodiment of an electronic type apparatus for monitoring open state of the CT according to the present invention.

FIG. 3 is circuit diagram of an electronic apparatus monitoring open state of the CT according to the present invention. The principle of the operation is basically the same with the relay type circuit, but it uses an Integrated Circuit (IC) instead of the relay coil.

The open voltage of the secondary terminals becomes the input signal, and TNR is inserted to protect the monitoring circuit from the over voltage, rectification of the input signal and the output process of the comparison voltage by the comparison amplifier is the same as the relay type. If the open voltage signal is outputted from the comparison amplifier by the opening of the CT, this output signal is inputted to the input unit of the IC through the diode (D4). The resistor (R8) was used in order to prevent the opening of the input of the IC.

The input signal changes the state of the output (Q) of the IC to high (H) and turns on the light emitting diode (LED) through the resistor (R6), and the input signal is inputted to the gate of the TRIAC through the resistor (R5) and shorts both sides of the CT. Until the RESET-SW is pushed the output of the IC, the high (H) state is maintained and the TRIAC maintains the state of on (ON).

Meanwhile, the alarm signal is outputted from the alarm switch for the operation of other machineries in case of abnormity. In this embodiment a transistor was used as an alarm switch.

As the above-mentioned relay type circuit, a monitoring switch was included in this embodiment. If the monitoring switch is pushed to monitor the monitoring circuit and the apparatus like an ammeter, a wattmeter in rear side of the CT, the IC operates and maintains the state of output high (H), and by this the secondary terminals of the CT maintains short state, allowing repair and testing to be safely done. If the reset switch is pushed after the work, the original normal state is restored. Meanwhile, the electric power-supplying unit that supplied the electronic monitoring circuit of the present invention can be the same as that of the relay type circuit.

3. A Third Preferred Embodiment

Figure 4:
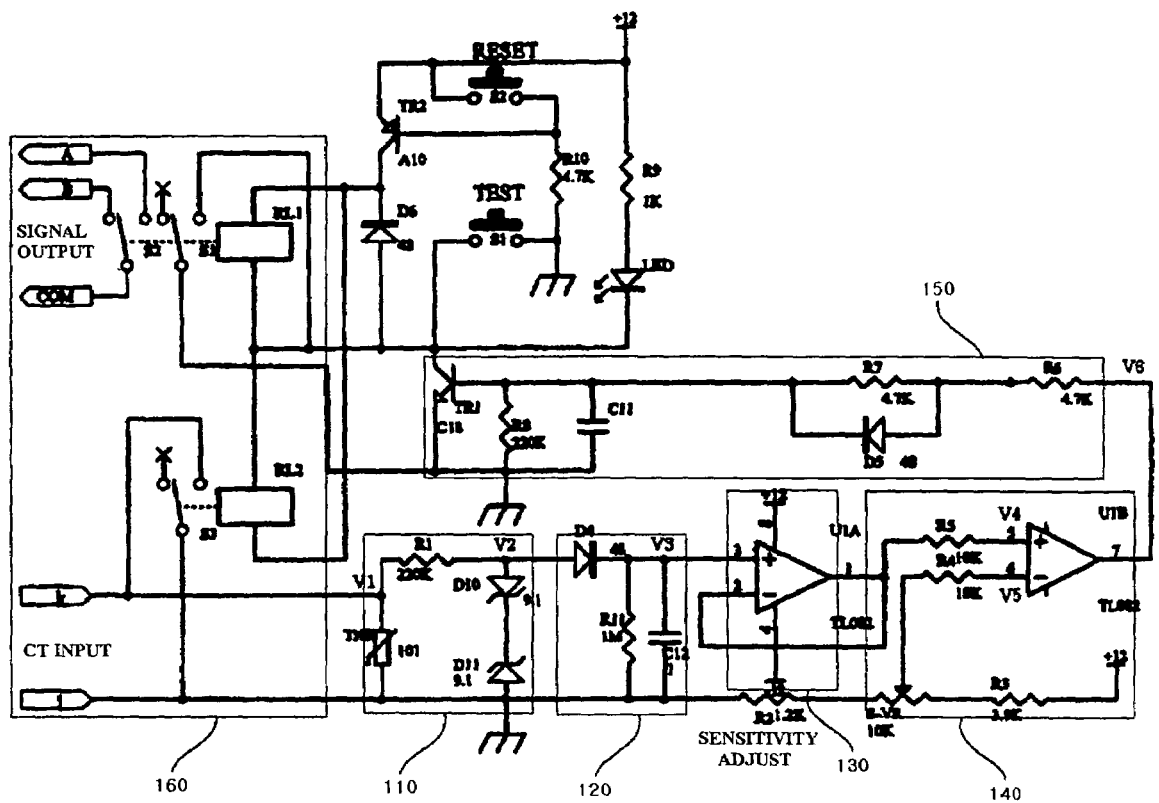
FIG. 4 is a circuit diagram of a preferred embodiment of an apparatus for monitoring open state of the CT according to the present invention.

FIG. 4 shows another embodiment of an apparatus for monitoring an open state of the CT according to the present invention. The basic structure is similar to the apparatus shown in the second preferred embodiment, but further comprises a buffer amplification unit that amplifies the DC voltage value outputted from said rectification unit. The buffer amplification unit lessens the influence of the output of the CT and raises the input impedance; and an OP-AMP is preferably used as the amplifier. The buffer amplification unit in FIG. 4 is constructed by the OP-AMP and the applied electric power source (+12V) supplies electric power to the OP-AMP. The detailed operation of the circuit in FIG. 4 is as follows.

If the secondary terminals become open in the state of current flowing at the primary coil of the CT, a high value of voltage will be applied to the secondary terminals (k-1), and this applied voltage (V1) becomes the input voltage of the monitoring circuit.

This voltage of open terminals (V1) has very large value generally. Therefore a circuit protection unit (110) is constructed to protect the monitoring circuit from over voltage (V1). A varistor (TNR) that protects the front end is inserted in the circuit protection unit (110), current is limited at resistor R1 secondarily, the over voltage is broken once more at the primary Zener diode (D10) and secondary Zener diode (D11), and so a safe value of voltage (V2) ('safe voltage' hereinafter) results that does not damage the monitoring circuit. Like this, the circuit protection unit (110) receives over voltage (V1) and outputs safe voltage (V2). The circuit protection unit (110) in FIG. 4 is constructed by the varistor (TNR), resistor (R1), primary Zener diode (ZD1), and secondary Zener diode (ZD2).

As stated above, since the monitoring circuit of the present invention monitors the open voltage of the secondary terminals of the CT as the input signal instead of the open current of the secondary terminals of the CT, accurate monitoring is always possible independent of the range of the regular value of the secondary current of the CT (generally 5 Amperes).

The safe voltage (V2) outputted from the circuit protection unit (110) is changed to DC voltage through the rectification unit (120). That is, the rectification unit (120) receives the safe voltage (V2) outputted from the circuit protection unit and rectifies it via diode (D4), and flattens the waveform via condenser (C12), converting it to DC voltage (V3). The converted DC voltage (V3) is inputted to the buffer amplification unit (130). The rectification unit (120) in FIG. 4 is preferably constructed by the diode (D4), the resistor (R11) and the condenser (C11).

The buffer amplification unit (130) amplifies the DC voltage value (V3) outputted from said rectification unit (120) by using external applied electric power source (12V). The buffer amplification unit (130) lessens the influence of the output of the CT and raises the input impedance, and an OP-AMP is used as the front-end amplifier. The buffer amplification unit (130) in FIG. 4 is constructed by the OP-AMP and the applied electric power source (+12V) that supplies electric power to the OP-AMP.

The voltage signal (V4) amplified by the front end amplifier (OP-AMP1) and passed resistor R4 is inputted to the comparison amplifier (OP-AMP2) with the standard voltage (V5) respectively, and in this case the comparison unit outputs a positive (+) voltage.

The detailed description is as follows. The output voltage (V4) signal of said buffer amplification unit (130) passes through the resistor R5 and is inputted to the positive (+) terminal of OP-AMP2. Meanwhile, standard voltage (V5) generated by a separately DC applied electric power source Vcc (+12V), resistor R2, resistor R3, and variable resistor S-VR is applied to the negative (-) terminal of said comparison amplifier (OP-AMP2). If the voltage (V4) inputted to the comparison amplifier gets higher than the standard voltage (V5) for the reason of opening of the secondary terminals of the CT, the comparison amplifier outputs a positive (+) voltage (V6), and current flows to the direction of R6 of the relay operation unit (150). Meanwhile, in a normal state when the secondary terminals of the CT are not open, said input voltage (V4) is not higher than the standard voltage (V5) and so the comparison amplifier outputs at a negative (-) voltage (V6), so the relay circuit unit does not operate. The comparison unit (140) in FIG. 4 is constructed by the resistors R2, R3, R4, R5, and the electric power source Vcc (400) applied to the comparison amplifier (OP-AMP2).

As stated above, if the secondary terminals (k-1) of the CT are opened, the output of the comparison amplifier (V6) is applied to the base terminals of the transistor (TR1) after passing through the current limitation of the resistor R6, R7 in the relay operation unit (150), and the condenser C11 maintains the voltage value applied to the base terminals of said transistor (TR1) for a prescribed time. In this case said condenser 11 can be charged quickly by the diode D5, and it is discharged through the resistor R6, R7, and R8 for the time of discharging.

And if voltage is applied to the base terminals of the transistor (TR), current flows from the collector to the emitter, and so the relay circuit unit (160) operates.

During the operation of relay circuit unit (160), the resistor R9 limits current and a Light Emitting Diode (LED) is turned on to indicate an alarm, and the magnetism-maintaining switch (S1) grounds the electric potential of one side of the relay and lets the relay coil maintain magnetism. Moreover, if the alarm switch S2 is closed, it lets the manager know the open state of the secondary terminals of the CT by operating the circuit of the alarm system, and if the short switch S3 is closed, it shorts the secondary coil of the CT. These switching operations of S1, S2, and S3 can make each switch close almost at the same time of current flowing at the relay coil. It is possible because of the electromagnetic induction by the relay circuit unit (160).

Meanwhile, if current flows at the relay circuit unit (160), magnetism is generated and it makes the short switch S3 close, and during this time the manager finds the abnormal part of the CT and repairs it and pushes a specially prepared reset switch (RESET-SW), terminating the state of magnetism-maintaining. That is, if the reset switch (RESET-SW) is pushed, it becomes open state in relation to the applied electric power source (+12V) and so the switches S1, S2, and S3 revert to their original state. That is, because of the reset of S1 the state of magnetism-maintenance terminates, because of the reset of S2 the circuit of the alarm system stops operation, and because of the reset of S3 the open state of the secondary terminals of the CT terminates. It will be recognized by those of skill in the art that the relay circuit unit can operate with a switch that operates as a short switch or an alarm switch, using various electronic parts like a transistor, TRIAC, SCR and photo relay, further to describe the manner of operation.

The monitoring switch can be also prepared at the monitoring apparatus in FIG. 4, and the manager can operate the short circuit unit by pushing the monitoring switch if necessary, and the secondary terminals of the CT can maintain the short state to allow necessary work to be safely done.

Figure 5:
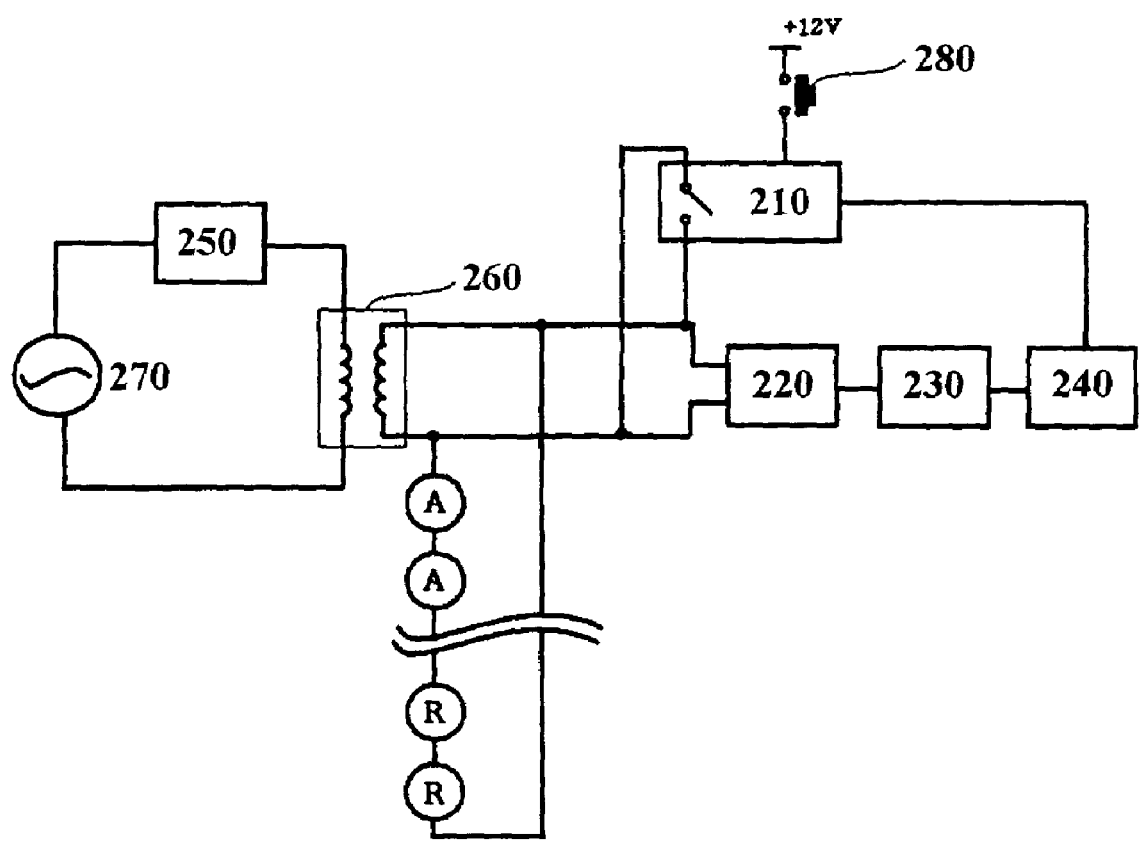
FIG. 5 is a block diagram of the structure of the electric equipment that realized the apparatus monitoring open state in FIG. 4.

FIG. 5 relates to a monitoring apparatus operating with connection to electric equipment. As shown in the Figures, general electric power source (270) and load are connected to primary terminals of a CT (260), and various kinds of measuring apparatus like an ammeter, a wattmeter, a relay, a recorder and the monitoring apparatus according to the present invention are connected to the secondary terminals of the CT.

If the secondary terminals of a CT are opened, the open voltage becomes an input signal of the monitoring apparatus, and passes through a protection unit (220) that breaks the over voltage and a rectification unit (230) that rectifies the signal and changes it to DC, the comparison unit (240) that compares the standard voltage value and the value of rectified signal, the short circuit unit (210) that includes the short switch, and shorts the secondary terminals of the CT.

Meanwhile, if a monitoring switch is pushed, electric power is supplied to the short circuit unit (210) and accordingly the short circuit unit operates and so the secondary terminals of a CT are shorted. That is, even if the open signal is not inputted from the comparison unit (240), short state of the secondary terminals of the CT can be maintained safely always through the monitoring switch (280) when necessary.

4. A Fourth Preferred Embodiment

Generally, if the secondary terminals of a CT are opened, open state voltage is generated, and if the open signal is monitored in case of opening the secondary terminals of a CT, by making this open state voltage a signal source, the present invention prevents damage to the secondary of a CT by shorting the secondary terminals of the CT. In this case the short circuit can be constructed by relay contact point or various electronic parts like a transistor, a TRIAC, an SCR and a photo relay functioning similar to the relay contact point.

The apparatus for monitoring open state of the secondary terminals of a CT of this invention outputs signal of the status of operation in case of abnormality in the secondary terminals of the CT, and uses this output signal for automation or as a signal source of other machinery tools. That is, this output signal can be the voltage output signal using relay contact point or transistor, or can be the output signal of data of other machinery or tools via an RS-232 output, using an IC.

If a test switch of a monitoring apparatus of the present invention is pushed, the CT is shorted when testing the operation of this apparatus or testing the machineries connected to the rear side of the CT, and so it is easy to test, change, and repair an ammeter, a wattmeter, a relay, a recorder and the like connected to the rear side of the CT. Generally, in order to test or repair machinery connected to the rear side of the CT, the terminals of the CT had to be shorted by an electric wire before working. At this time the CT can be shorted merely by pushing the test switch in this apparatus.

Figure 6:
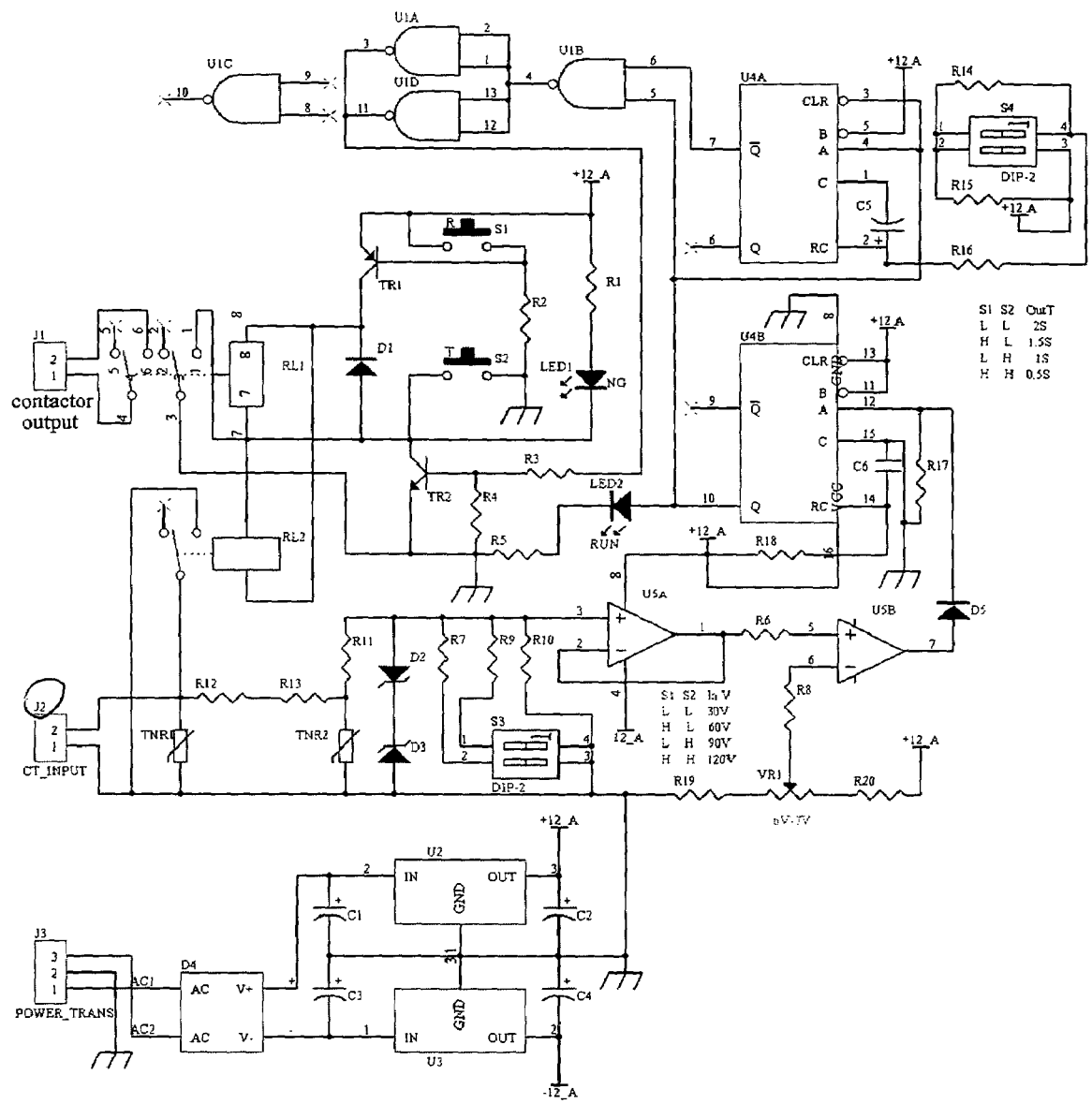
FIG. 6 is a structural view of the circuit of another preferred embodiment of a relay type apparatus for monitoring open state of the secondary terminals of the CT according to the present invention.

Now referring to FIG. 6, more detailed explanation is provided. The monitoring apparatus of this invention receives the voltage induced at the CT coil when the CT is opened as the input signal of the circuit through the CT input terminals (J2). In order to protect the front end of the circuit from the over voltage inputted from the terminals (J2), TNR1 is inserted and the apparatus lets the voltage pass through resistors R12, R13, and lowers any over voltage with TNR2, limits current with resistor R11, and lowers the voltage than the voltage of the electric power source at the Zener diodes (D2, D3). Here, TNR1 and TNR2 are shorted if the voltage higher than prescribed is applied, and TNR1, TNR2, and Zener diode are triple safety devices that protect the circuit from the over voltage.

After lowering the voltage passed the input protection circuit through the resistor R10, the voltage that is needed to indicate an open voltage of the CT is set by using a Dual In-Line Package (DIP) Switch (S3).

By using the amplifier (OP Amp) U5A as a front-end buffer and raising the input impedance, the influence of the output of the CT is lessened and sufficient current can be provided to the circuit. The amplified signal with the amplifier U5A is inputted to comparison amplifier (U5B) through resistor (R6), and a comparison voltage made by resistors (R19, R20) and semi-fixed resistor (VR1) in order to compare with the voltage inputted at the time of opening of the CT. The voltage is applied to the negative (−) input terminal of the amplifier (OP Amp) U5B through resistor (R8).

After comparing the voltage applied to positive (+) terminal with the signal voltage applied to negative (−) terminal, positive (+) voltage is outputted when the signal voltage is high and a negative (−) voltage is outputted at a normal state.

If the secondary terminals of the CT are opened and the signal voltage is applied to the comparison amplifier U5B, through the diode (D5) only a positive (+) voltage output of the comparison amplifier is inputted to the A terminals of Integrated Circuit (IC) U4B which is for time delay, and simultaneously it is inputted to the C terminal of IC U4B through resistor (R17) in order to prevent the false operation by a false input signal.

From the time that the input voltage of IC U4B raises to "H", the output (Q) of U4B maintains "H", and without signal, it is reset to "L" after 20 msec. Circuit delay time is preferably calculated by a Equation 1.

$$R18 \times C6 \qquad \text{EQUATION 1}$$

C6: capacity of the condenser
R18: resistor value

Figure 7:
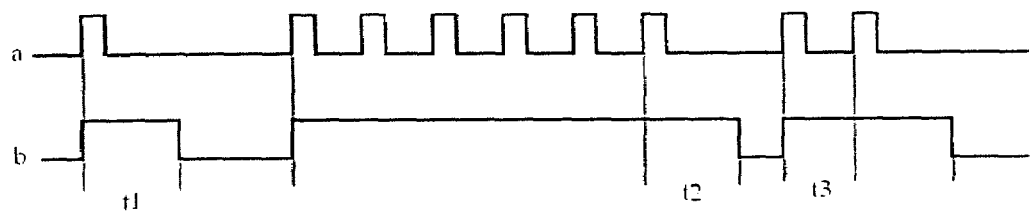
FIG. 7 is a waveform diagram of a U4B input-output signal in FIG. 6.

In this embodiment, a cycle of 25 msec~30 msec larger than a standard cycle of 60 Hz (16.6 msec) or 50 Hz (20 msec) is preferable. This is referred to as a primary delay herein. The primary delay is an art that was introduced to prevent the complication of the system by using the circuit rectifying AC to DC, and the concept is shown in FIG. 7. In FIG. 7, waveform 'a' means U4B input signal and becomes 'H' in case of signal voltage, waveform 'b' means U4B output signal, and t1, t2, and t3 mean delay time.

As the circuit of the present invention compares the peak value of +side of the signal voltage with the standard voltage and outputs, the output of the comparison unit appears as the pulse wave same with that of a 50 or 60 Hz electric power frequency, so by setting 25 msec~30 msec as the primary delay time, when the peak value exists in +side of signal voltage as the middle part of FIG. 7, IC input signal is outputted as a repetition of 'H' and 'L' and so the output signal of the U4B maintains 'H' signal continuously and until 25~30 msec from the 'H' rising of the final signal, it is outputted as 1. But as the left part of FIG. 7, the input signal of U4B becomes 'H', 'L' only once and so appears L except the section of delay time t1, thereby having the same effect as a rectifier.

Light Emitting Diode (LED2) will illuminate to indicate secondary delay operation state only when the open signal is monitored, that is, only when the output Q of U4B is high. The incentive of considering this time delay is to prevent false operation of other relays when the over voltage generated by an accident except the CT opening is induced to the circuit, and in order to give time to the relay for protection operates i.e. secondary delay time), time delay IC (U4B) is used and the secondary delay time is set by using DIP Switch (S4). When not considering this secondary delay time, if abnormal voltage is generated by an accident like a grounding fault, over voltage can be induced to the CT by the over current and so there is a danger of misjudgment of the open state of the secondary terminals of the CT and operation, and in this case unexpected secondary accident may happen. In order to prevent this, the present invention improves the safety of the system by introducing the concept of setting of the secondary delay time. The delay time is calculated by a Equation 2.

$$C5 \times R16 + R14 + R15 \qquad \text{EQUATION 2}$$

C5: capacity of a condenser
R14, R15, R16: resistor values

In general, since the CT is designed to stand a prescribed time (for example 1 minute), it can stand sufficiently the over voltage generated at a shorter time by an accident except the opening of the secondary terminals of the CT, so the setting of the secondary delay time according to the present invention has a very important meaning. That is, according to the present invention, by considering the operating time of other relays of the secondary terminals of the CT, misjudging an accidental opening of the secondary terminals of the CT can be removed.

The expression under the DIP switch S4 in the upper portion of the right side of FIG. 6 illustrates the set value of the time delay, and clearly the secondary delay time is not limited to those values. In this embodiment, four kinds of delay time are set by the combination of two switches S1, S2. In this example, the set value can be set as 2 seconds, 1.5 seconds, 1 second and 0.5 second.

The output signal of IC U4A for setting the secondary delay time is outputted delayed as the calculation according to Equation 2 from the time of the output of U4B rises to H.

The output $\overline{Q}$ of U4A which is delayed output and the output Q of U4B are inserted as an input of NAND gate U1B and since 'L' is outputted only when both of the signals are 'H', by using NAND gates (U1A, U1D) as the inverting buffer and inverting the output signal, 'H' output is made.

Figure 8:
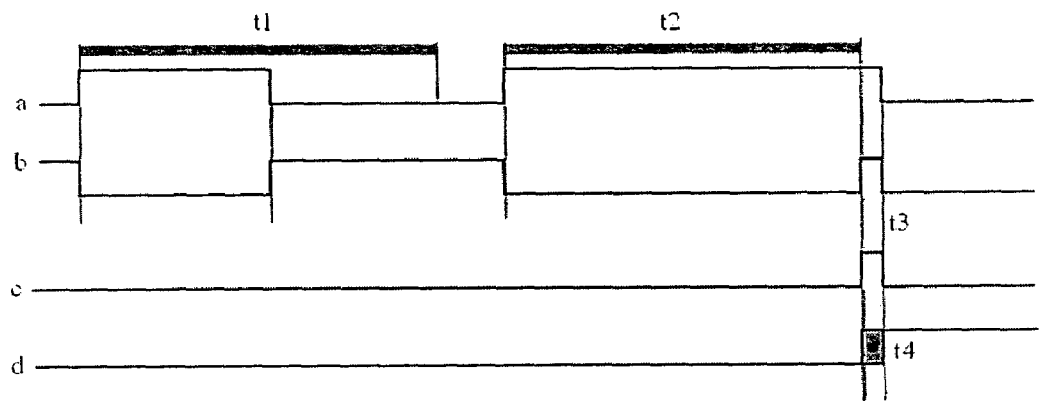
FIG. 8 is a waveform diagram of a U4A output, U4B output, U1A output, U1D output and the signal of relay operation in FIG. 6.

In FIG. 8, waveform 'a' is the output signal of U4B (LED is ON), waveform 'b' is the output signal of U4A, waveform 'c' is the output signal of U1A, D, waveform 'd' is a relay operation signal, t1 denotes a time period that is smaller than operation delay set value, t2 denotes a time period that is larger than operation delay set value, t3 is a relay operation delay time, and t4 is a relay operation time. In the output waveform 'a' of U4B, the left side 't1' of the green part of FIG. 8 denotes a time that is smaller than the set value of the secondary operation delay time, and the right side 't2' denotes a time that is larger than the set value of the secondary operation delay time.

If the output voltage (H) of NAND gates U1A, U1D is applied to the base of the NPN transistor (TR2), forward bias voltage is applied to base-emitter and the transistor operates to become ON state, current of collector flows into emitter and operates relay RL1, RL2.

In order to prevent the circuit from the reverse electromotive force applied to the coil at the time of the operation of the relay, the diode (D1) is used to lessen the reverse electromotive force. As the base voltage of PNP transistor TR1 maintains GND electric potential through the resistor (R2) and forward bias voltage is applied to base-emitter and the transistor operates to maintain ON state, the relay always maintains the voltage of 12V.

If the relays RL1, RL2 operate, the relay-gearing switch (contact point 1 of RL1) operates, and the electric potential of one side of a relay becomes GND, and the relay maintains magnetism. During the operation of the relay, current is limited through the resistor R1, the light emitting diode (LED1) is turned on, and so indicates the state of operation.

In case of monitoring abnormal signal, as the relays R1, R2 maintain magnetism, if the manager finds the abnormal part of the CT and repairs it and pushes a reset switch (S1), +12V is applied to the base of the transistor (TR1), and the transistor (TR1) becomes turns OFF, and +12V of the relay gets OFF, so the function of maintaining magnetism disappears and the relay reverts to its original state. The switch of the relay (RL2 contact point) shorts the CT coil in order to prevent break down of other parts by the opening of the CT.

The switch of the relay (RL1 contact point 2) is outputted to the contact point for the operation of other machinery as for alarm in case of abnormal station. For the test of the machinery and the test of the machinery of rear side of the CT, if the test switch S2 is pushed, by making one side of the relays RL1, RL2 GND, the relay operates without input signal and so the magnetism is maintained. If the manager finishes testing and repairing and pushes the reset switch (S1), it reverts to a normal state.

If AC electric power is inputted to the primary terminals of a transformer by the electric power source unit in order to supply necessary electric power to the present invention, decompressed voltage is induced to the secondary terminals of the transformer, and after rectified through diode D4, the output waveform is flattened by condensers (C1, C3), and the flattened voltage is supplied to the circuit as voltage of +12 and −12 through voltage regulars IC (U2, U3).

Meanwhile, at the left side of a Dual In-line Processor (DIP) switch S3, four kinds of voltage values can be selected according to the combination of two switches S1, S2. These voltage values are different according to the CT and indicates the over voltage that can be generated in case of opening the secondary terminals of the CT. In this example the over voltage is set as 30V, 60V, 90V, 120V, but it is clear to a person having ordinary skill in the art of this invention that these values can be changed as various voltage values according to the variation of this invention. For example, if set as 30V and the voltage inputted to the CT is over 30V, open state of the secondary terminals of the CT is determines and the apparatus of the present invention operates. This value is inputted to the positive (+) terminals of the comparator U5A. As described above, the present invention sets a few over voltage according to opening of the secondary terminals of the CT in advance, and it is possible to meet the over voltage efficiently.

As the characteristic of the load is different according to the CT, for example, starting current appears higher than regular current in case of load starting. Therefore over voltage can be generated so that it is possible to misjudge that the second terminals of the CT is opened. Accordingly, in order to prevent this case, by setting set values about expected over voltage values in advance, the present invention lets the user choose the set value according to the characteristics of the load.

If false operation by the over voltage cannot be prevented only by setting the secondary delay time as stated above, various over voltage values are set in advance according to the characteristics of the load, so for the momentary over voltage according to the characteristics of the load like the load of motor, the secondary terminals of the CT is not determined as opened.

5. A Fifth Preferred Embodiment

A circuit monitoring open state of a CT of this embodiment is a circuit for monitoring open state of a CT that shorts the secondary terminals by making said open voltage as the input signal in case that the secondary terminals of the CT is open, and includes a circuit protection unit that breaks the over voltage to prevent the damage of the monitoring circuit from the open voltage having over voltage value and outputs a safe voltage; a rectification circuit unit that outputs DC voltage by making the safe voltage outputted from the circuit protection unit as an input signal; a front end amplification unit that amplifies the DC voltage value outputted from said rectification circuit unit by using special external applied electric power source; a comparison amplification unit that compares the amplified voltage from said front end amplification unit and applied standard voltage, and outputs positive (+) voltage if said amplified voltage is higher than said standard voltage and outputs negative (−) voltage if said amplified voltage is lower than said standard voltage; a current connection unit that flows current to the relay coil by a transistor operates by making said positive (+) output voltage signal as a current control signal in case that said comparison amplification unit outputs positive (+) voltage because of the opening of the secondary terminals of the CT; and a relay circuit unit that shorts the secondary terminals of the CT if current flows to the relay coil by said current connection unit and so the short switch is closed, and maintains the short state of the secondary terminals continually until the system is reset by the close of the magnetism-maintaining switch.

Meanwhile, it is preferable that said circuit protection unit comprises a varistor (TNR) to break the over voltage, a resistor to limit current (R1), primary Zener diode (ZD1) to control the trigger voltage at (+) cycle of AC, and secondary Zener diode (ZD2) to control the trigger voltage at (−) cycle of AC.

Moreover, it is preferable that said relay circuit unit further comprises an alarm switch that operates the alarm system notifying the opening of the secondary terminals of the CT by current flows at the relay coil.

Figure 9:
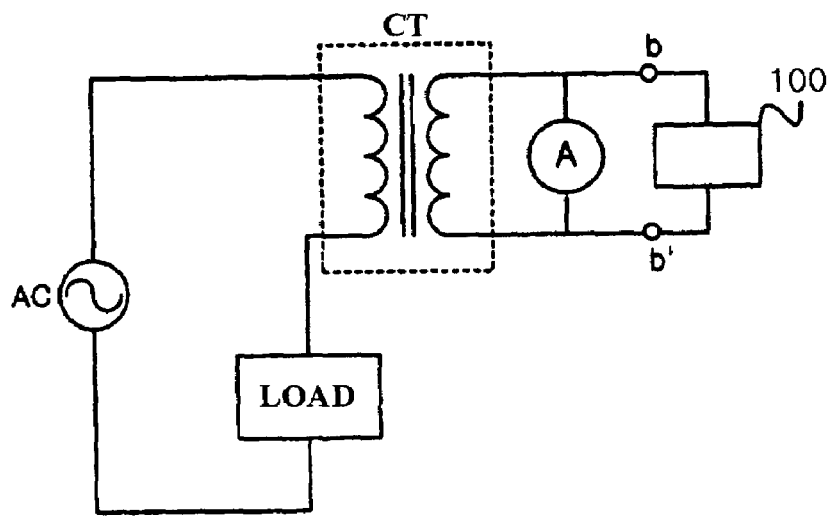
FIG. 9 is a block diagram of a circuit of another embodiment of an apparatus for monitoring open state of the CT.

Now referring to FIG. 9, more detailed explanation about the circuit for monitoring the open state of a CT of the present invention is to be given. FIG. 9 is a block diagram that indicates the structure of a circuit for monitoring the open state of a CT according to the present invention. As shown in the figure, the primary coil of the CT is connected between the load and the electric power source, and measuring apparatus like an ammeter and the circuit for monitoring open state of a CT is connected to the secondary coil of the CT in parallel. In FIG. 9, only one ammeter as the measuring apparatus is connected but, a recorder, a wattmeter, and the like can be connected.

The circuit (100) for monitoring open state of CT of the present invention comprises a circuit protection unit (10), a rectification unit (20), a front-end amplification unit (30), a comparison amplification unit (40), a current connection unit (50), and a relay circuit unit (60). Special electric power source (400) is applied in order to supply electric power.

Figure 10:
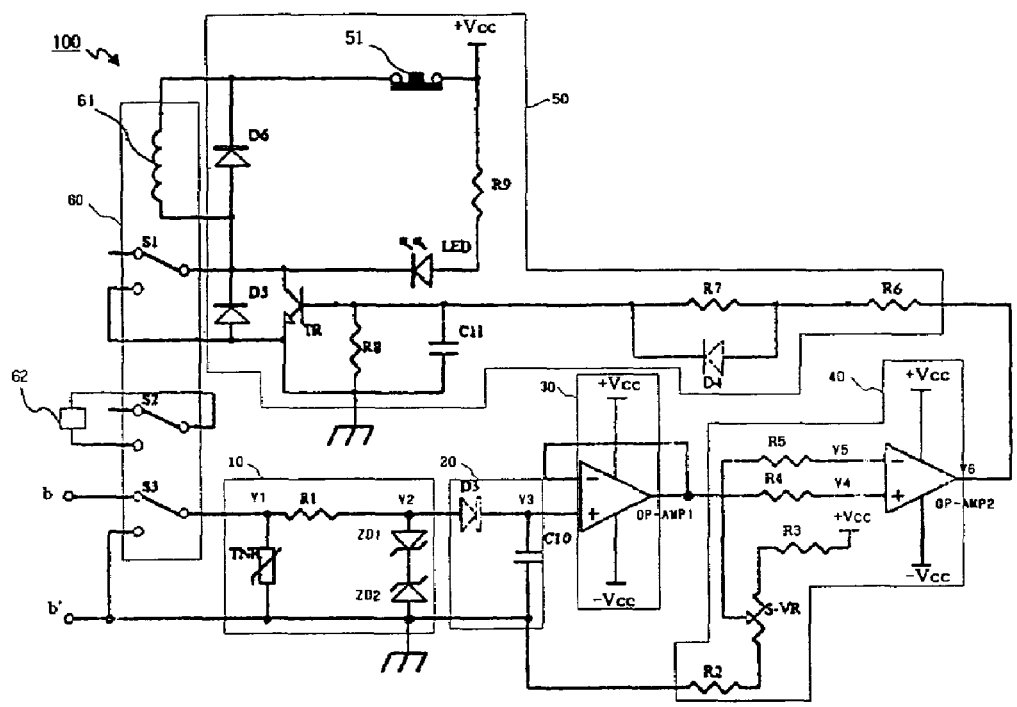
FIG. 10 is a detailed structural view of the circuit of the apparatus for monitoring open state of the CT in FIG. 9.

FIG. 10 is a detailed structural view of the apparatus for monitoring open state of a CT according to the present invention. Now referring to FIG. 10, more detailed explanation will be given. If the secondary terminals (b-b') become open in the state of current flowing at the primary coil of the CT, high-valued open voltage appears at the secondary terminals (b-b'), and this applied voltage (V1) becomes the input voltage of the monitoring circuit.

This voltage of open terminals (V1) generally has a very large value. Therefore a circuit protection unit (10) is constructed to protect the monitoring circuit from the over voltage (V1). A varistor (TNR) that protects the front end is inserted in the circuit protection unit (10), current is limited at resistor R1 secondarily, the over voltage is broken once more at the primary Zener diode (ZD1) and secondary Zener diode (ZD2), and so safe valued voltage ($V_2$) ('safe voltage' hereinafter) that does not damage the monitoring circuit is outputted. Like this, the circuit protection unit (10) receives over voltage ($V_1$) and outputs safe voltage ($V_2$). The circuit protection unit (10) in FIG. 10 is constructed by the varistor (TNR), resistor (R1), primary Zener diode (ZD1), and secondary Zener diode (ZD2).

As stated above, since the monitoring circuit of the present invention makes the open voltage of the secondary terminals of the CT as the input signal instead of the open current of the secondary terminals of the CT, accurate monitoring is always possible independent of the range of the regular value of the secondary current of the CT (generally 5 Amperes).

The safe voltage ($V_2$) outputted from the circuit protection unit (10) changes to DC voltage through the rectification circuit unit (20). That is, the rectification circuit unit (20) receives the safe voltage ($V_2$) outputted from the circuit protection unit and rectifies it through the diode (D3), and the waveform is flattened through the condenser (C10) and changed to DC voltage ($V_3$). The changed DC voltage ($V_3$) is inputted to the front-end amplification unit (30). The rectification circuit unit (20) in FIG. 10 is preferably constructed by the diode (D3) and the condenser (C10).

Figure 11:
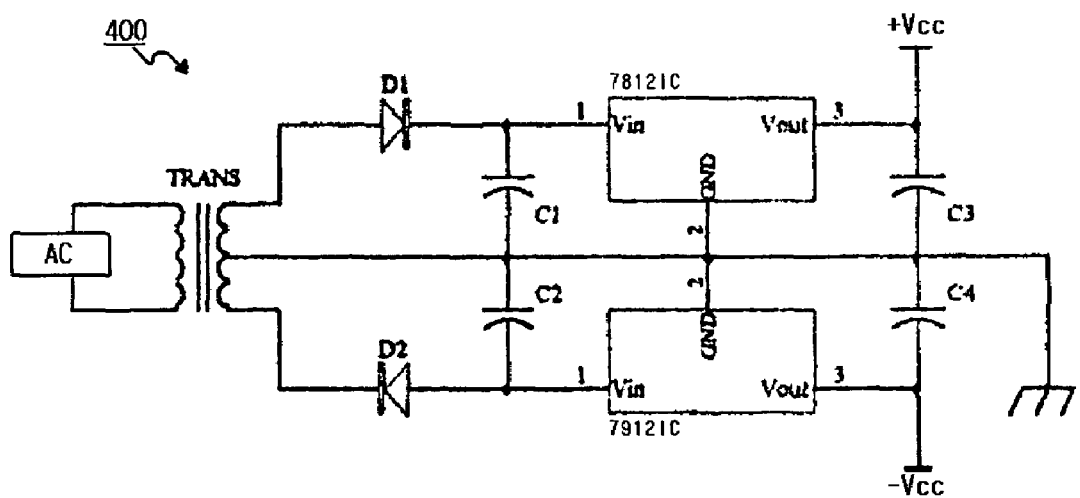
FIG. 11 is a structural view of the applied electric power source unit that supplies electric power to the apparatus for monitoring open state of the CT in FIG. 9.

The front-end amplification unit (30) amplifies the DC voltage value ($V_3$) outputted from said rectification circuit unit (20) by using external applied electric power source (400), shown in FIG. 11. The front-end amplification unit (30) lessens the influence of the output of the CT and raises the input impedance; OP-AMP1 is used as the front-end amplifier. The front-end amplification unit (30) in FIG. 10 is constructed by the OP-AMP1 and the applied electric power source (400) that supplies electric power to the OP-AMP1.

The voltage signal ($V_4$) amplified by the front end amplifier (OP-AMP1) and passed by resistor R4 is inputted to comparison amplifier (OP-AMP2) with the standard voltage ($V_5$) respectively, and in this case the comparison unit outputs a positive (+) voltage, which can vary as follows. The output voltage ($V_4$) signal of said front-end amplification unit (30) passes through the resistor R4 and is inputted to the positive (+) terminal of OP-AMP2, which is the comparison amplifier (41). Meanwhile, standard voltage ($V_5$) generated by special DC applied electric power source Vcc (400), resistor R2, resistor R3, and variably resistor S-VR is applied to the negative (−) terminal of said comparison amplifier (OP-AMP2). If the voltage ($V_4$) inputted to the comparison amplifier gets higher than the standard voltage ($V_5$) for the reason of opening of the secondary terminals of the CT, the comparison amplifier (41) outputs a positive (+) voltage ($V_6$), and current flows to through R6 of current connection unit (50). Meanwhile, at a normal state when the secondary terminals of the CT are not opened, the input voltage ($V_4$) is not higher than the standard voltage ($V_5$) and so the comparison amplifier (41) outputs a negative (−) voltage ($V_6$), and the relay circuit unit does not operate. The comparison unit (40) in FIG. 10 is constructed by the resistors R2, R3, R4, R5, and the electric power source Vcc (400) applied to the comparison amplifier (OP-AMP2).

As stated above, if the secondary terminals (b-b') of the CT are opened, the output of the comparison amplifier ($V_6$) is applied to the base terminals of the transistor (TR) after passing through the current limitation of the resistors R6, R7 in the current connection unit (50), and the condenser C11 maintains the voltage value applied to the base terminals of said transistor (TR) for a prescribed time. In this case the condenser 11 can be charged quickly by the diode D4, and it is discharged through the resistors R6, R7, and R8 for the time of discharging. The current connection unit (50) in FIG. 10 is constructed by the resistors R6, R7, R8, R9, the diodes D4, D5, D6, the Light Emitting Diode (LED), the transistor (TR), the reset switch (51), the condenser C11 and the electric power source Vcc (400).

And if voltage is applied to the base terminals of the transistor (TR), current flows from the collector to the emitter, and so current flows at the relay coil (61), accordingly the relay circuit unit (60) operates. The relay circuit unit (60) in FIG. 10 is constructed by the relay coil (61) and the switches S1, S2, and S3.

During the operation of relay circuit unit (60), the resistor (R9) limits current and the Light Emitting Diode (LED) is turned on to indicate an alarm, and the magnetism-maintaining switch (S1) grounds the electric potential of one side of the relay and let the relay coil maintain magnetism. Moreover, if the alarm switch (S2) is closed, it lets the manager know the open state of the secondary terminals of the CT by operating the circuit of the alarm system (62), and if the short switch (S3) is closed, it shorts the secondary coil of the CT. These switching operations of S1, S2, and S3 can make each switch close almost at the same time of current flowing at the relay coil. It is possible because of the electromagnetic induction by the relay coil (61).

Reverse electromotive force is generated at the relay coil (61) at the time of the operation of the relay circuit unit (60), and this reverse electromotive force badly influences the monitoring circuit (100) of the present invention. So in order to lessen the reverse electromotive force generated at the relay coil (61), diodes D5, D6 are provided.

Meanwhile, if current flows at the relay coil (61), magnetism is generated and it makes the short switch S3 close, and during this time the manager finds the abnormal part of the CT and repairs it and pushes a specially prepared reset switch (51), then the state of magnetism-maintaining terminates. That is, if the reset switch (51) is pushed, it becomes open in relation to the applied electric power source (400) and so the switches S1, S2, and S3 revert to their original state. That is, because of the reset of S1 the state of magnetism maintaining terminates, because of the reset of S1 the circuit of the alarm system stops operation, and because the reset of S3 to the open state of the secondary terminals of the CT terminates.

The electric power-supplying unit (400) supplies DC electric power to the monitoring circuit. As shown in FIG. 10, the power is applied to the amplifiers 1, 2 (OP-AMP 1, 2) from the front end amplifier and the comparison amplifier respectively and connected to one side of the terminals of the relay coil, to let current flow at the relay coil when the opening of the secondary coil of the CT.

FIG. 11 is a structural view of the applied electric power source unit (400) that supplies electric power to the apparatus for monitoring open state of the CT according to the present invention. As shown in FIG. 11, the structure of the electric power source unit (400) is that AC electric power source is connected to the primary terminals of the transformer circuit and so decompressed voltage is induced to the secondary terminals and the decompressed voltage is rectified through the diode (D1, D2), and the output waveform is flattened through condensers (C1, C2) and generates DC voltage +Vcc and −Vcc through the constant voltage IC (Integrated Circuit).

A brief description of the operation of the monitoring circuit of the present invention referring to FIG. 10 is as follows. If the secondary terminals of the CT (b-b') are opened, current flows at the relay coil (61) in the relay circuit unit (60) through the circuit protection unit (10), the rectification circuit unit (20), the front-end amplification unit (30), comparison amplification unit (40), current connection unit (50) by making the open voltage as the input signal. In this case, a phenomenon of electromagnetic induction is generated and by this, the magnetism-maintaining switch S1, the alarm switch S2, the short switch S3 is closed respectively. The manager finds the accident once alerted by the alarm system, and can eliminate the caution to prevent an accident. If the manager terminates the state of magnetism maintaining by pushing a reset switch (51) after the repair, the switches S1, S2, S3 revert to an original state, and the system operates normally.

Meanwhile, by the apparatus for monitoring open state of a CT of the present invention, damage of the CT and electric shock can be prevented by shorting the secondary terminals immediately in case of it is opened. Moreover, by preparing the test switch in the monitoring apparatus, the secondary terminals of the CT can be maintained the state of short safely at the time of testing or repairing various measuring apparatus like a current transformer connected to the electric equipment, and so safe operation without electric shock is possible.

Since the monitoring apparatus of the present invention provides electronic type as well as the relay type, and can be constructed variously by transistor, TRIAC, SCR, photo relay and the like as well as the relay switch as the electric element that shorts the secondary terminals, the monitoring circuit can be constructed flexibly according to the situation.

The apparatus for monitoring open state of the secondary terminals of a CT of the present invention can lessen the false operation by making the monitoring apparatus operate after prescribed time in order to give time to operate other protecting relay when the over voltage is induced at an accident except the CT opening. The present invention subdivides the prescribed value of the secondary delay operation time, so the safety of the system can be improved, and by prescribing expected over voltage value variously according to the characteristic of the load, letting the user choose the over voltage value suitable for the characteristics of the load according to necessity, the opening of the secondary terminals of the CT is determined only when the voltage over than the corresponding over voltage is generated, so the misjudgment that can be made for the over voltage generated momentary at the time of motor starting in normal operation can be prevented.

If the test switch in the monitoring apparatus of the present invention is pushed, CT is shorted at the time of confirming the operation of the present apparatus and testing the machineries connected to the rear side of the CT, so testing, changing, and repairing the ammeter, wattmeter, relay, and recorder and the like connected to the rear side of the CT is easy.

The invention in the preceding specification is described in regard to exemplary embodiments thereof. It will, however, be evident to one of ordinary skill in the art that various modifications and changes may be made thereto without departing from the sprit and scope of the invention, as set forth in the following claims. Accordingly, the specification and drawings are to be regarded as illustrative rather than restrictive.

What is claimed is:

1. A method for determining opening of secondary terminals of a current transformer and preventing an accidental opening comprising;
   preventing false operation of a protecting relay connected to the secondary terminals caused by and over voltage generated by an accident other than opening of the secondary terminals of the current transformer;
   setting a secondary delay time that the protecting relay can operate and allowing operation after a prescribed time;
   setting by a user a desired set value by setting said secondary delay time variously by a Dual In-line Package (DIP) switch;
   determining whether the second terminals of the current transformer are open by the over voltage generated temporarily when the normal operation of various loads including motor starting, by setting in advance expected over voltage values according to characteristics of the load;
   letting the user choose the over voltage value suitable for the characteristics of the load according to necessity;
   allowing an apparatus to operate when greater voltage than the value set by the user is inputted to the current transformer; and
   indicating an operating state by using one or more warning indicators when an open signal of the secondary terminals of the current transformer is detected.

2. A circuit for monitoring open state of a current transformer that shorts secondary terminals by making an open state voltage as an input signal in case that the secondary terminals of the current transformer are opened, said circuit comprising:
   a circuit protection unit that breaks the over voltage to prevent damage to a monitoring circuit from the open state voltage and outputs a safe voltage;
   a rectification circuit unit that outputs DC voltage using the safe voltage outputted from the circuit protection unit as an input signal;
   a front-end amplification unit that amplifies the DC voltage outputted from said rectification circuit unit by using an externally applied electric power source;
   a comparison amplification unit that compares the amplified voltage from said front-end amplification unit and an applied standard voltage, and outputs a positive (+) voltage if said amplified voltage is higher than said standard voltage and outputs a negative (−) voltage if said amplified voltage is lower than said standard voltage;
   a current connection unit that provides current to a relay coil by a transistor operating by making said positive (+) output voltage signal as a current control signal when said comparison amplification unit outputs a positive (+) voltage signal because of opening of the secondary terminals of the current transformer; and
   a relay circuit unit that shorts the secondary terminals of the current transformer if current flows to the relay coil by said current connection unit to close a short switch, and maintains a shorted state of the secondary terminals continually until the system is reset by closing a magnetism-maintaining switch.

3. The circuit as set forth in claim 2, wherein said circuit protection unit comprises a varistor to break the over voltage, a resistor to limit current, a primary Zener diode to control a trigger voltage at a positive (+) cycle of input alternative current, and a secondary Zener diode to control the trigger voltage at a negative (−) cycle of input alternative current.

4. The circuit as set forth in claim 2, wherein said relay circuit unit comprises an alarm switch that operates an alarm system notifying of opening of the secondary terminals of the current transformer by current flows at the relay coil.

* * * * *